C. DEAVS.
2 Sheets—Sheet 1.
Gas Apparatus.
No. 3,042.
Reissued July 21, 1868.
Fig. 1,
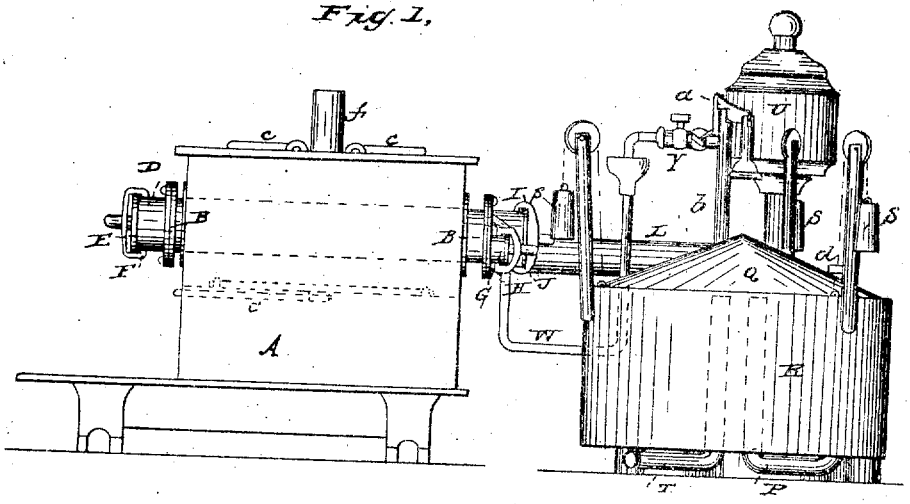
Fig. 3,
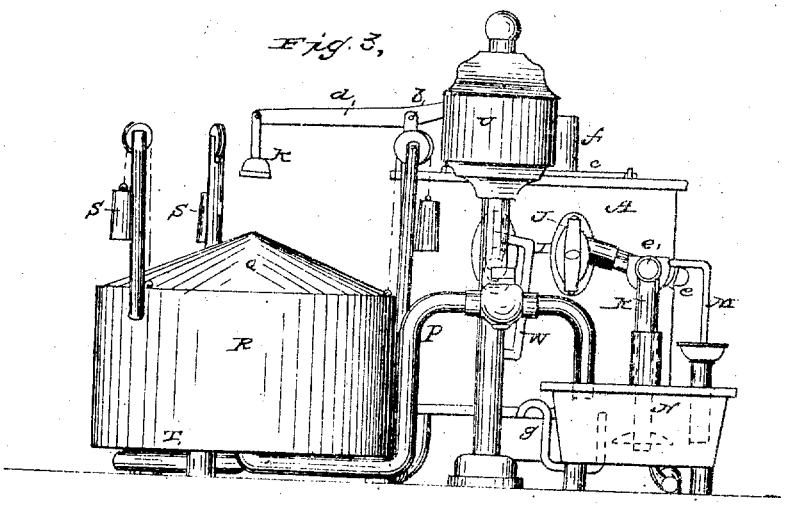
Witnesses:
A. Wickham Hoe
Inventor:
Charles Deavs
By Howson & Westmore
Attys C. DEAVS.
2 Sheets—Sheet 2.
Gas Apparatus.
No. 3,042.
Reissued July 21, 1868.
Fig. 1,
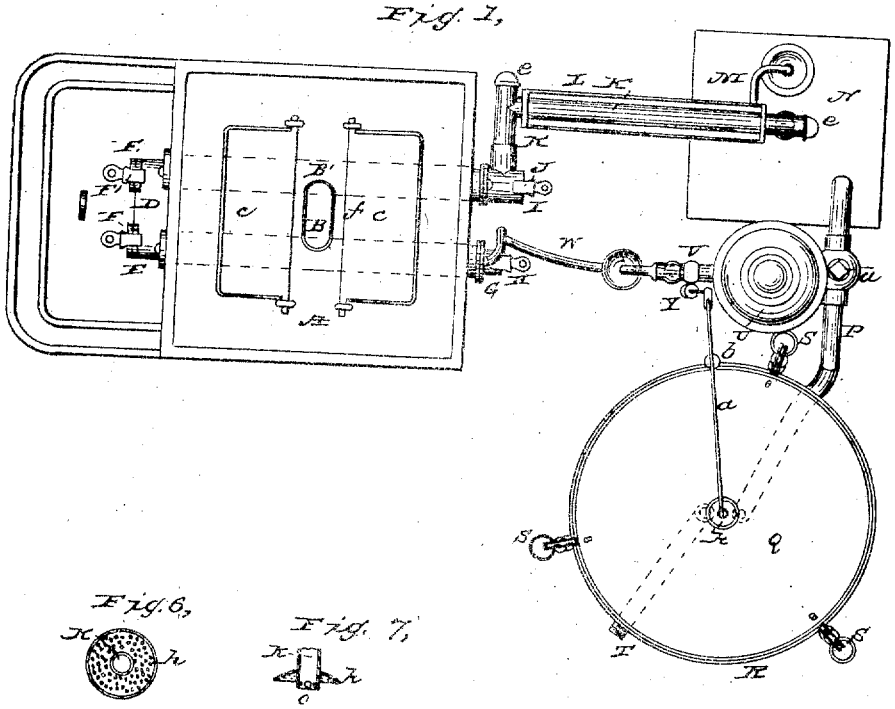
Fig. 6,
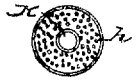
Fig. 7,
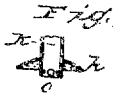
Fig. 4,
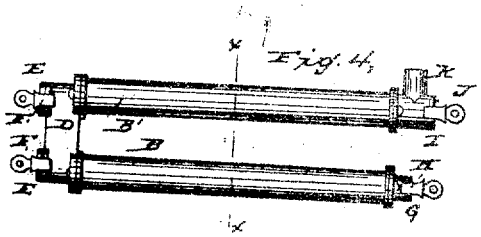
Fig. 5,
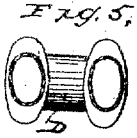
Witnesses:
H. Middleton Hale
Inventor
Charles Deavs
By Hart & Widdows
Attys

United States Patent Office.

CHARLES DEAVS, OF NEW YORK, N. Y.

*Letters Patent No. 66,004, dated June 25, 1867; reissue No. 3,042, dated July 21, 1868.*

IMPROVED GAS-APPARATUS.

*The Schedule referred to in these Letters Patent and making part of the same.*

TO ALL WHOM IT MAY CONCERN:

Be it known that I, CHARLES DEAVS, of the city, county, and State of New York, have invented certain new and useful Improvements in Gas-Apparatus; and I do hereby declare that the following is a full, clear, and exact description thereof, reference being had to the accompanying drawings, and to the letters of reference marked thereon.

My invention consists in manufacturing illuminating-gas from oil, by first volatilizing it in a retort, and in then superheating, cooling, and filtering it on its way from the point of volatilization to the receiver, as will be hereinafter more fully described.

And, further, my invention consists in setting a pair or pairs of retorts, for making illuminating-gas from oil, in one or more furnaces, in such manner as to bring the bottoms of said retorts down to within a short distance of the surface of the grate-bars, so as to immerse said retorts, wholly or in part, in the ignited fuel with which the furnace is supplied.

And my said invention also consists in joining the ends of said retorts by means of a union-coupling, fitted with caps removable at pleasure, by which the said retorts can be cleaned with greater facility than heretofore, as will be herein fully described.

And, further, my said invention also consists in abstracting the heat from the gas as it flows from the superheater or retort towards the gasometer, by drawing it through a pipe immersed in a bath of cold water, as hereinafter set forth.

And my said invention also consists in a novel method of introducing the gas into the filter, for the purpose of more thoroughly and rapidly cooling and washing it, as hereinafter described.

And my said invention also consists in introducing the oil of which the gas is made into the retorts against the pressure contained therein, and while the apparatus is in operation, by means of a reservoir, connected to the retorts by pipes, and elevated high enough to overcome the resistance by the column or weight of the oil, as will be hereinafter set forth.

And my said invention further consists in regulating the flow of oil from the reservoir to the retort, by the action of the gas-receiver or holder, as it rises and falls upon a valve or cut-off, applied to said reservoir or its delivery-pipe, as will be hereinafter described.

My invention has for its object the production of a superior illuminating-gas cheaply, and in such manner as to require but little skill in its manufacture, the apparatus being so simple as to be readily understood, and easily adapted to the use of private houses, hotels, boarding-houses, manufactories, *&c.*

The apparatus will be readily understood by the following description of the annexed drawing, making part of this specification, and in which.—

Figure 1 is a plan of my apparatus complete.

Figure 2 is a side elevation of the same.

Figure 3 is a rear elevation of the same.

Figure 4 is a plan view in detail of the retorts and immediate connections.

Figure 5 is a section in detail of the retorts

Figure 6 is an under side view of the discharge-end of the conductor-pipe.

Figure 7 is a section in detail of the same.

In these figures, A is the furnace, in which the retorts B B′ are set.

The retorts are connected to each other, at one end, by the short pipe or connection D, which has lids or covers E E, secured by yokes F F.

The opposite end of the retort B is also furnished with a lid, G, and yoke H, to facilitate the cleaning of the retort B.

The corresponding end of the retort B′ is also furnished with a cover or lid, I, secured by a yoke, J. To this end of the retort B′ is attached one end of the conductor-pipe K. This conductor-pipe is immersed in a trough, L, which is constantly supplied with cold water, from any suitable source, and which overflows into the filter or wash-box N, through the pipe M. By this means the water in the trough L is kept cool, and that in the wash-box or filter kept comparatively pure.

The conductor K terminates beneath the surface of the water in the wash-box, in the form shown in figs. 6 and 7.

The lower end of said conductor-pipe K is perforated, as seen at O in fig. 7, and immediately above these perforations a concavo-convex disk, *h*, of perforated metal or wire cloth, is secured around the conductor, with the concave side downward, so that the gas, as it rises to the surface after passing out of the conductor, must pass through this disk and become minutely divided, and thus be thoroughly washed.

P is the pipe which conveys the gas, after it is washed, from the filter to the holder Q. This gas-holder is made in the ordinary manner. It is set in the cistern R, and counterbalanced by weights S.

T is the main pipe, by which the gas is fed from the holder Q to the supply-pipes.

U is the oil-reservoir, which contains the supply of oil for the retorts, and which is raised high enough to send the oil into the retort by the force of its own gravity against the pressure of the gas.

The oil is fed through the pipe V into the siphon W, which feeds it to the retort B.

The pipe V is supplied with a cut-off, Y, which is worked by the rising and falling of the holder Q.

The said holder, as it rises, strikes the weight attached to the lever *a*, which works in the rod or support *b* as a fulcrum, and the opposite end operates the cut-off, and cuts off the supply of oil so soon as the holder Q is filled with gas.

*c c* are damper-lids, which are for the purpose of regulating the draught.

The grate, on which the fire rests, is shown in dotted lines at C.

The pipe P is supplied with a stop-cock, *d*, by which the gas may be prevented from flowing back when the retorts are cooled, or when it is necessary to open any of the other connections.

The conductor K has caps *e* at each bend, by the removal of which the said conductor may be cleaned.

*f* is the flue for carrying off the products of combustion from the furnace A.

*g* is a siphon, for carrying off the surplus water from the wash-box and the products of condensation which float on its surface. For this purpose the inner end of said siphon is put at the height at which it is intended to keep the water.

There are usually two of these siphons, both discharging at the same side of the water-box. They may be enclosed in glass, to prevent the air becoming unpleasantly affected by the odor of the matters condensed in the wash-box and discharged through said siphons.

In operating my machine or apparatus, the reservoir U is first filled with oil, and a fire having been kindled, the furnace A is filled with coal to a sufficient height to cover the retorts, and the coal brought to a cherry red, and the covers *e* shut down. So soon as the retorts are sufficiently heated, the stop-cock in the pipe V is opened, thus feeding the oil to the retort B. Here it is volatilized, after which it passes, by means of the connection D, to the retort B′, where it is superheated, and the gas entirely disengaged. It then passes through the conductor K to the wash-box, being sufficiently cooled on its way by passing through that part of the conductor which is immersed in the trough L. As it issues from the conductor, it rises against the disk or sieve *h*, which breaks it into very fine globules, and thus brings it thoroughly in contact with the water, by which it is perfectly washed. From the wash-box the gas passes through the pipe P into the holder Q, which rises as it becomes filled, until it has received nearly as much as is desired, when it comes in contact with the weight *k*, and lifts it, and thus, by means of the lever *a* and cut-off Y, cuts off the supply of oil, and checks the manufacture of the gas. When the gas is used out of the holder, it gradually sinks, until it allows the stop-cock Y to be opened by the weight *k*, when the manufacture of the gas is resumed.

The drawing shows two retorts set in one furnace, the oil being introduced and volatilized in one, and superheated in the other. The retorts are made comparatively short, for convenience in cleaning and filtering, but the volatilization and superheating may both be done in one retort, by making it long or in compartments. Two retorts are, however, I think, preferable, as in this case the temperature of the superheater can be more evenly maintained, and the temperature of the volatilizer need not be kept so high, and will not, therefore, be so rapidly burned out.

Having thus fully described my invention, I claim—

1. The connecting-couplings D and K, in combination with the retorts, when fitted with plates E G I, to facilitate the cleaning of the retort, substantially as described.

2. The use of two or more retorts, connected together in pairs, so that the first shall volatilize the oil or oily substance, and the second shall complete the conversion thereof into a fixed gas, suitable for illuminating purposes, the said retorts being constructed and arranged substantially as and for the purpose hereinabove set forth.

3. The combination, with the conducting-pipe K, of a cooling-trough, L, the water from which supplies the wash-box, substantially as and for the purpose set forth.

4. The combination, with the discharge-end of the conductor-pipe K, of a perforated or reticulated disk, *h*, substantially as and for the purpose set forth.

CHARLES DEAVS.

Witnesses:

AMOS BROADNAX,

PETER D. KENNY.